UNITED STATES PATENT OFFICE.

JOSEPH B. McGLYNN, OF CLEVELAND, OHIO, ASSIGNOR TO THE WEST STEEL CASTING COMPANY, OF CLEVELAND, OHIO, A CORPORATION OF OHIO.

METHOD OF PREPARING STEEL FOR CASTING.

1,394,103.  Specification of Letters Patent.  Patented Oct. 18, 1921.

No Drawing.   Application filed April 17, 1919. Serial No. 290,761.

*To all whom it may concern:*

Be it known that I, JOSEPH B. McGLYNN, a citizen of the United States, residing at Cleveland, in the county of Cuyahoga and State of Ohio, have invented a certain new and useful Improvement in Methods of Preparing Steel for Casting, of which the following is a full, clear, and exact description.

The present invention is directed to a method or process by which molten steel or similar ferrous material may be prepared from mixtures of scrap steel or scrap iron, pig iron and ferro alloys, said molten metal being utilized in the manufacture of steel or semi steel for castings.

The purpose of the invention is to provide a method which will reduce the cost of preparing molten metal for the purpose above specified, which will permit the preparation of said molten metal from relatively cheap grades of iron or steel scrap.

A further object is to save time in the production of a high grade of steel or semi steel which is entirely suitable for steel or semi steel castings, having good pouring qualities and producing steel or semi steel castings which are tough and resistant to breakage due to shock and rough usage.

Generally speaking, the invention may be defined as the process and the steps thereof set forth in the accompanying claim.

The usual method at present employed in preparing a heat of molten steel for casting purposes is to melt in an electric or other suitable furnace a charge of scrap steel, or, a mixture of scrap steel and pig iron to produce a good melting and working mixture.

In producing steel castings having qualities required for any desired purpose, it is customary to refine the metal after the same has been melted, while still in the furnace by subjecting the same to a continued heating and boiling action until the carbon present in the metal is contained in the desired amount. But this procedure involves a rather long treatment of the molten metal and during the treatment, particularly if the effort be made to reduce the quantity of carbon present much below 0.50%, the oxidizing of the iron occurs to such an extent as to cause a considerable loss, which may go as high as 10%.

The process which forms the subject matter of this invention proceeds in two steps. The first step consists in melting a charge of scrap steel or a mixture of scrap steel and scrap iron in an electric or other suitable furnace, and the second step consists in introducing the resulting molten metal to a converter of the usual type and blowing said molten metal.

In proceeding with the first step of the process, the furnace charge may be made up of scrap steel or a mixture of scrap steel and scrap iron and the additional elements or materials necessary to make a good molten metal may be supplied by directly introducing the proper ferro-alloys, or, by using low phosphorus pig iron as a part of the furnace charge.

It is entirely feasible and possible to introduce the required amount of carbon into the furnace charge by using scrap material which is high in carbon, as, for instance, spring steel scrap or similar material.

After the scrap steel or mixture of scrap steel and low phosphorus pig iron, as the case may be, has been introduced into the furnace, the said scrap steel or mixture of scrap steel and low phosphorus pig iron is melted and the heating action is continued until the metal is molten, and it is brought up to the proper temperature for determining the composition of the melted metal. This is determined by making a test bar and fracturing the same.

The carbon and silicon content of the molten metal should be approximately:

Carbon, 0.50% to 1.00%.
Silicon, 0.50% to 1.00%.

If the carbon and silicon are above these limits the metal is further refined, but if below this may be adjusted by the addition of the proper amounts of ferro-alloys, such as ferro-silicon, or ferro manganese or both to the molten metal.

The hot metal is now charged into a converter of the usual type and blown in the usual manner, until the carbon manganese and silicon amount to 0.10% or less, each.

It should be noted that inasmuch as the silicon carbon and manganese are present in much lower quantities than usual in the case of making converter steel, the action in the converter in the present process is slightly different than in the case of making converter steel. The flames produced are somewhat different and the time required to complete the blow is much shorter.

Recarbonizing the resulting metal is done in the usual manner.

The process has distinct advantages. In the first place, the total loss in melting and blowing is very low, usually not exceeding 6% or 7%; whereas preparing a casting steel in an electric or other suitable furnace and refining the same in the furnace entails a loss that may be as high as 10%, and the converter loss in the standard converter practice will run anywhere from 12% to 25%.

In the second place, much time is saved. In the first operation of the process melting and preparing the molten metal requires one to one and one half hours as compared to two to three or more hours in the usual melting and refining method. In the second operation of the process, blowing time is between six and ten minutes as compared with fifteen to twenty minutes for standard converter practice. In the third place experience has shown that uniform metal can be repeatedly produced which metal has all the desired characteristics of a good casting steel.

Having thus described my invention, what I claim is as follows:

The method of preparing molten steel for casting, which comprises melting a charge of steel containing scrap steel, in a suitable furnace, refining the same until the carbon and silicon are present in desired proportions and then introducing the molten metal from the furnace into a converter, and blowing the same until the carbon and silicon content and manganese content have been reduced to the amount desired.

In testimony whereof I hereunto affix my signature.

JOSEPH B. McGLYNN.